Feb. 19, 1929.
T. W. B. WATLING ET AL
WEIGHING SCALE
Filed July 18, 1918
1,702,582
2 Sheets-Sheet 1
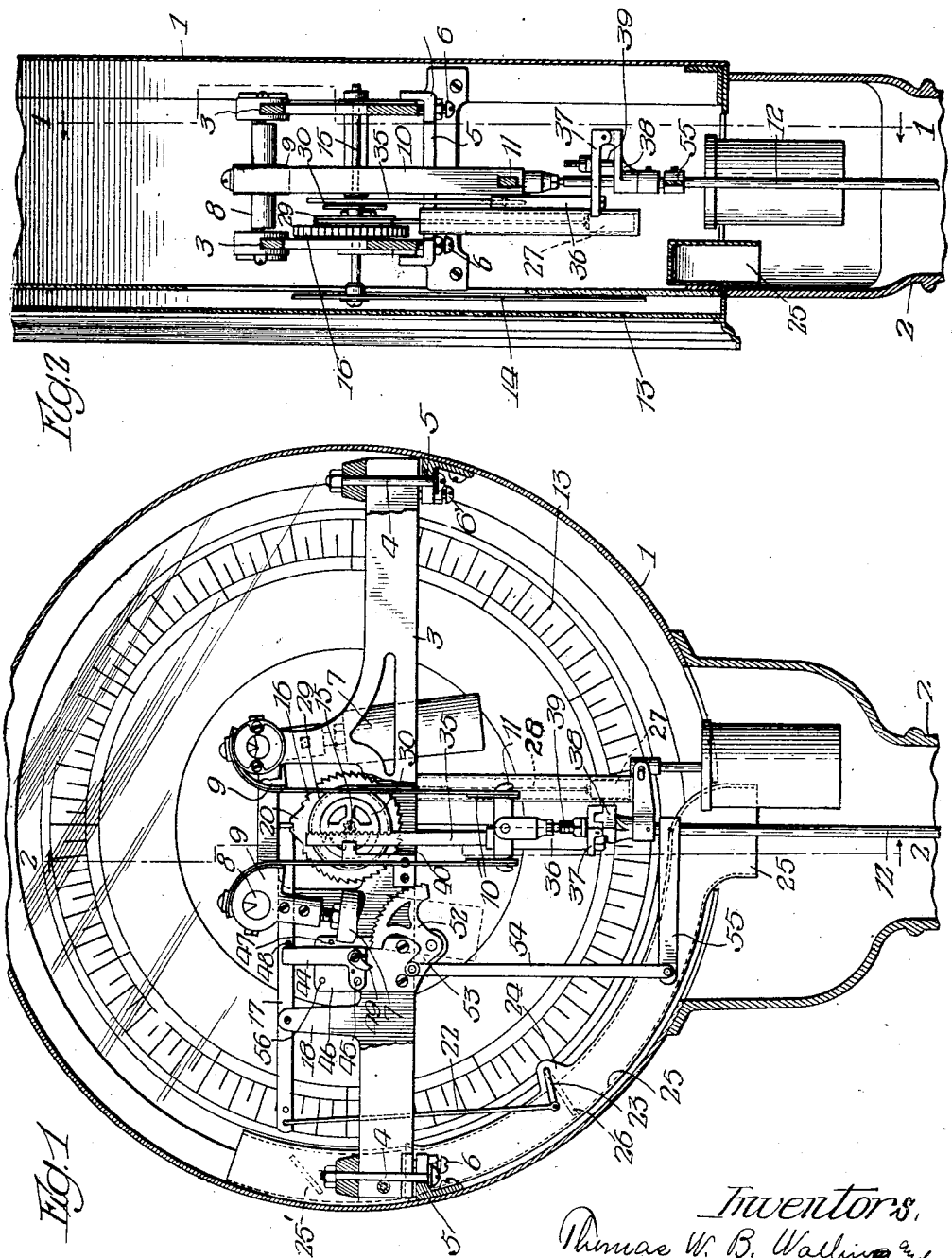

Feb. 19, 1929.  1,702,582
T. W. B. WATLING ET AL
WEIGHING SCALE
Filed July 18, 1918  2 Sheets-Sheet 2
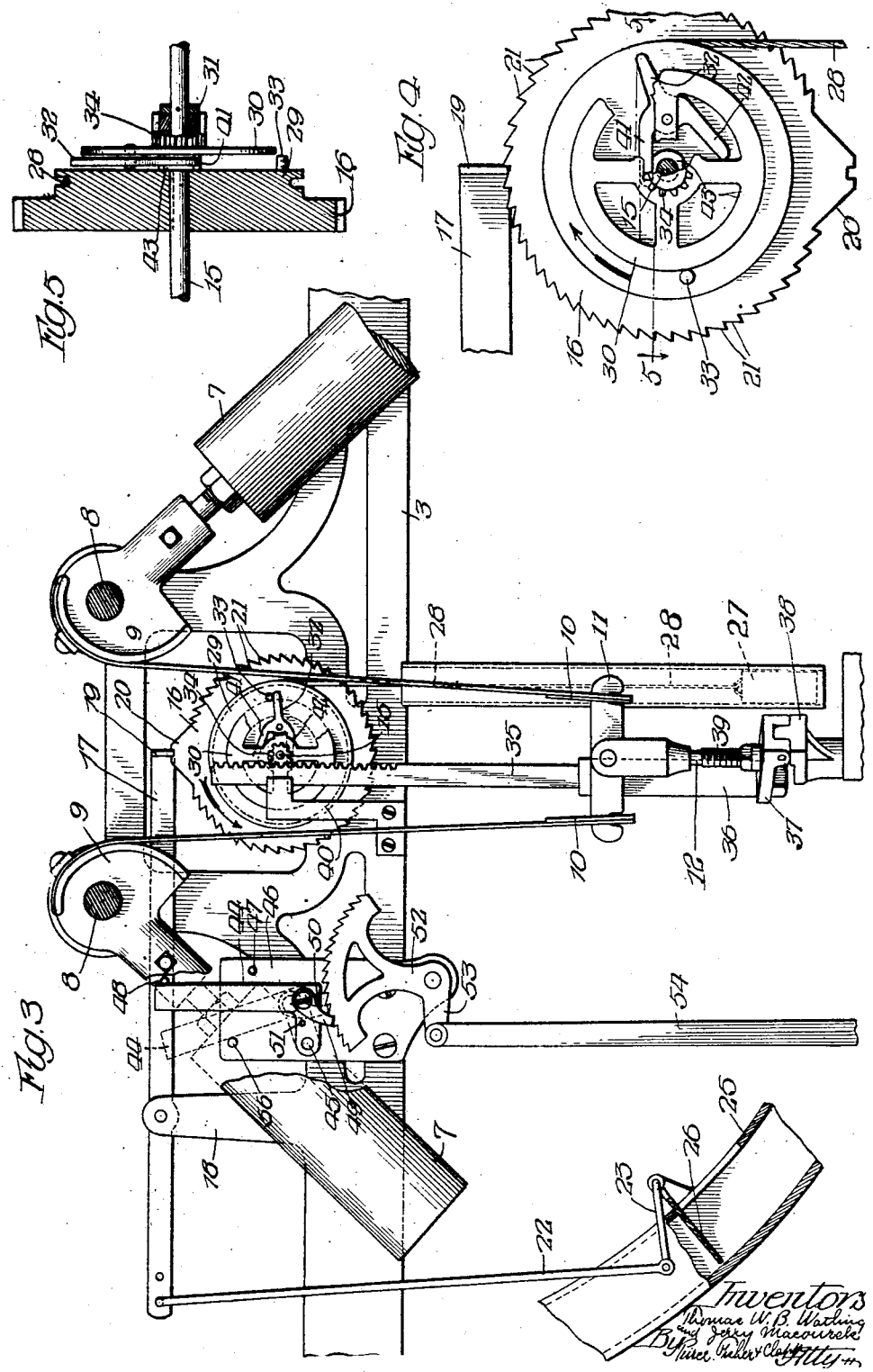

Patented Feb. 19, 1929.

1,702,582

UNITED STATES PATENT OFFICE.

THOMAS W. B. WATLING AND JERRY MACOUREK, OF CHICAGO, ILLINOIS; SAID MACOUREK ASSIGNOR TO SAID WATLING.

WEIGHING SCALE.

Application filed July 18, 1918. Serial No. 245,452.

The invention relates to weighing scales of that type employing a weight-actuated member which is counterbalanced by a spring or weighted lever and which is shifted to different positions in accordance with the load on the scale, the latter having a normally locked indicator which is controlled by the weight-actuated member. The invention seeks to provide improved means for controlling the operation of the indicator which will not interfere with its proper operation but which, when the indicator is released, will prevent more than one weight indicating operation.

The invention consists in the features of improvement hereinafter set forth, illustrated in the preferred form in the accompanying drawings and more particularly pointed out in the appended claims.

In the drawings, Figure 1 is a rear elevation of the upper portion of the weighing scale with parts broken away and shown in section on the line 1—1 of Fig. 2. Figure 2 is a vertical section on the line 2—2 of Fig. 1. Figure 3 is an enlarged detail view in rear elevation with parts shown in shifted position. Figure 4 is an enlarged rear elevation of parts of the weight indicating mechanism. Figure 5 is a detail section on the line 5—5 of Fig. 4.

The casing comprises a circular head 1 mounted upon the upper end of a column 2. A horizontal frame or bracket 3 is arranged within the head 1 and is secured at its ends by bolts 4 to a pair of lugs 5 fixed to the wall of the casing. Leveling screw bolts 6 extend through the lugs and engage the ends of the bracket. A pair of weighted pendulums 7 are fixed to short horizontal shafts 8 and the latter are provided with knife-edge pivots engaging suitable seats formed at the upper central portion of the frame 3. In Fig. 1 the rear portion of the frame 3 is broken away to show the mechanism mounted therein. A pair of cams 9 are fixed to the shafts 8 and two flexible metal bands 10 are fixed to and extend over the faces of the cams 9 and thence downwardly to a common cross bar 11 the ends of which engage openings formed in the lower ends of the straps. This cross bar is connected to the upper end of a rod or link 12 the lower end of which is connected to the usual weighing levers and platform (not shown) which are arranged at the lower end of the column 2. The weight of the person or object on the platform will, in the usual manner, shift the connecting link or rod 12 of the weighing mechanism and thereby swing the weighted pendulums outwardly from the position shown in Fig. 1, as indicated in Fig. 3. The cams 9 are so shaped that the extent of movement of these parts is directly proportional to the weight upon the scale platform. If desired, other suitable weighing mechanism may be provided.

A dial is provided at the front of the head 1 and in the form shown comprises a glass plate 13 having a circular scale marked thereon and an indicating pointer 14 is arranged to cooperate with the scale of the dial to indicate the weight. The indicating hand or pointer 14 is fixed to the forward end of a shaft 15 and the latter is journaled in suitable bearings on the central part of the bracket 3.

The extent of movement of the indicator from its normal zero position is controlled by the weighing mechanism but the indicator is movable independently of the weighing mechanism at least in one direction, and suitable lock or catch devices are provided for holding it in its normal or zero position and for preventing more than one weight indication for each coin deposited. In the preferred construction shown, a locking or catch wheel 16 is fixed to the front portion of the indicator shaft 15 and is arranged to cooperate with a catch or lever 17 pivotally mounted between its ends on an arm 18 that extends upwardly from the bracket 3. This catch lever extends inwardly from its pivot and its extreme inner end is provided with a laterally projecting portion 19 which extends over the locking or catch wheel 16 and is arranged to cooperate with a notched lug 20 and a series of teeth 21 formed upon the periphery of the wheel. The lug 20 is raised above the teeth 21; that is to say, its outer end is at a greater distance from the axis of the wheel than are the outer ends of the teeth and, in the normal or zero position of the indicator, the projection 19 on the catch lever 17 engages the notched lug to hold the indicator in this position. It should also be noted that the opposite side edges of the lug 20 are inclined or cam-shaped. The outer end of the catch lever 17 is connected by a link 22 to a crank arm 23. This crank arm is journaled in a lug 24 (see Fig. 1) which is formed upon the wall of a coin chute 25. A plate 26 fixed to the crank arm extends into the chute and into the path of coins falling through the chute. The parts are so arranged that when a coin is deposited in a coin-receiving slot 25' at the front of the machine case it will fall through the chute, strike the plate 26 and through the connections described lift the inner end of the catch lever 17 to release the catch wheel 16 and permit the movement of the indicating hand from its normal or zero position. The pivot of the catch lever is located nearer its outer end so that gravity tends to depress the inner end of the lever towards the catch wheel.

When the indicator is shifted from zero position, it raises a small weight 27 connected by a cord 28 to a grooved pulley 29 which is fixed to or formed in piece with the catch wheel 16. The forward movement of the indicator is preferably effected by a weight and the extent of movement is determined by stop devices which in turn are controlled by the weighing mechanism. In the preferred construction shown, a disk 30 loosely mounted on the indicator shaft 15 between the pulley 29 and a washer 31 carries an arm 32 which is arranged to cooperate with a pin 33 projecting from the face of the pulley 29. A pinion 34 fixed to the disk 30 is arranged to be engaged by a rack 35 and stop devices are interposed between the rack and the weighing mechanism, and these stop devices are preferably adjustable. As shown, the lower end of the rack is connected by a strap 36 to the end of a link or arm 37. The opposite end of the arm is pivoted to a bracket 38 which is fixed to the rod or link 12 of the weighing mechanism and an adjusting stop 39 is threaded through the arm and engages the bracket. The stop 39 is normally held in engagement with arm 38 by the weight of the rack 35 and by adjusting the stop, the indicator can be accurately set in zero position when there is no weight upon the scale platform. The upper end of the rack 35 engages a fixed guide 40 that holds it in proper engagement with the pinion 34.

The arm 32 is preferably pivoted on the disk 30 and has a forked inner end the members 41 and 42 of which are arranged to engage flattened faces on opposite sides of the hub 43 of the disk 30. In the normal position of the parts, the pin 33 which rotates with the indicating shaft and pointer engages the stop arm 32 and holds the member 42 thereof in engagement with the hub 43. When a weight is placed upon the scale platform, the weighing mechanism is shifted as described, but the rack 35 and the other parts of the indicating mechanism remain locked in normal or zero position. This is permitted by the pivoted connection between the arm 37 and the bracket 38. But when a coin is deposited, it releases the catch lever 17 as described and the weight of the rack 35 rotates the disc 30 and, through the medium of the arm 32 and pin 33, rotates the shaft 15 and indicating pointer 14 against the pull of the small weight 27 until the stop screw 39 again engages the stop arm or bracket 38. When the weight on the scale platform is removed, the rack 35 and disc 30 are returned to normal position by the weight 7 independently of the indicator shaft 15 and the parts fixed thereto, so that the arm 32 moves away from the pin 33. The indicator shaft and indicator are returned to normal much more slowly by the light weight 27. The stop arm 32 is so counterbalanced that, in normal position, it tends to assume the position shown in Fig. 4, with its arm 41 in engagement with the hub 43. But, in the normal position of the indicator shaft, the stop arm is engaged by the pin 33 and is held in the position shown in Fig. 3, with its arm 42 engaging the hub 43. The disc 30 and stop arm 32, when the weight is removed from the scale platform, are very quickly and forcibly returned to normal by the pendulum weights 7, and, if the indicator shaft has been advanced through nearly a complete revolution, the stop arm might, if rigid, strike against the pin 33 and be bent or the relation between the indicator and the stop be otherwise disarranged. But the lost motion connection between the forked inner end of the stop arm and the disc 30 prevents any such disarrangement of parts and also permits the use of substantially all portions of the scale on the dial for indicating weights. This arrangement of the stop arm also affords a yielding stop for the indicator so that the latter is brought to rest at its normal zero position without vibrating. The indicator shaft 15 and pointer 14 are moved to normal by the weight 27 and the arm 32 and pin act as stops to limit this movement and arrest the pointer in zero position.

Usually in similar scales the parts of the catch mechanism which are released by the coin to permit the shift of the indicator are re-engaged to hold the indicator in its shifted position and prevent further operation thereof until another coin is deposited, the re-engagement of the parts being controlled by a retarding or timing mechanism. Such retarding or timing mechanism, however, frequently permits a re-engagement of the catch parts before the oscillation of the indicator hand ceases and comes to a balance, so that the correct weight is not indicated. With the present improvement, a stop or like device is provided for preventing the re-engagement of the parts of the catch mechanism after it is released by the coin to permit the shift of the indicator hand from zero position, so that ample opportunity is afforded for the indicator hand to cease oscillating and come to a balance to indicate the correct weight. To prevent improper manipulation of the scale, the weighing mechanism is arranged to control a trip device which engages the catch parts if the weight on the scale platform is altered.

In the construction shown, the device for holding the catch parts out of engagement comprises an L-shaped stop or dog 44 the lower horizontal arm of which is connected by a pivot 45 to a plate 46 on the frame 3. The stop or dog is normally gravity held in the position shown in full lines in Fig. 3 out of contact with a fixed pin 47 on the plate 46 and with the upper end of its vertical arm engaging a pin 48 on the catch lever 17. A trip pawl 49 pivoted to the angle of the stop or dog 44 is arranged to play between two pins 50 and 51 thereon and is also arranged to be engaged by the teeth of a segment 52. The latter is pivotally mounted upon the lower portion of the plate 46 and a laterally projecting arm 53 fixed to the segment is connected by a depending link 54 to an arm 55 which is fixed to and projects laterally from the upper end of the link or rod 12. In the normal idle condition of the scale, the segment 52 is out of engagement with the trip pawl 49 and the latter is gravity held against the stop pin 50. When a weight is placed upon the scale, the trip segment 52 is shifted into engagement with the pawl 49, and, when a coin is deposited in the chute 25, the inner end of the catch lever 17 and the pin 48 thereon are raised, so that the stop or dog 44 moves against the pin 47 and beneath the pin 48. The engagement of the upper end of the dog then prevents the re-engagement of the lever 17 with the catch 16. The parts are so arranged that it makes no difference whether the coin is deposited before or after the weight is placed on the scale platform. In either event, the dog holds the catch lever 17 in released position.

As the link or rod 12 of the weighing mechanism and the arm 55 thereon are depressed, the teeth of the segment 52 pass idly beneath the pawl but any substantial decrease in weight on the scale platform, as would necessarily occur if attempt were made to obtain the direct indication of the weight of a second person or thing, will effect the shift of the segment 52 in the opposite or in clockwise direction and thereby shift the stop or dog 44 into engagement with a stop pin 56 on the plate 46, as shown in dotted lines in Fig. 3. This movement shifts the dog or lug from beneath the pin 48 on the catch lever and permits the latter to engage the teeth 21 of the catch wheel 16, as shown in Fig. 4.

In operation, a weight upon the platform of the scale moves the pendulum weights 7 outwardly, but the indicating mechanism, as stated, remains in normal position. When a coin is deposited, it trips the catch lever 17 and disengages the projection 19 thereon from the lug 20 on the catch wheel 16. The indicating mechanism is then rotated by the weight of the rack 35, as described, in the direction of the arrow shown in Fig. 3, until the stop 39 again engages the stop arm 38. The catch lever is, as stated, prevented from engaging the teeth 21 of the catch wheel by the engagement of the upper end of the stop or dog 44 with the pin 48 on the catch lever, so that ample opportunity is afforded for the indicating hand to cease oscillation and come to a balance to indicate the correct weight. Any decrease in weight on the platform, however, immediately shifts the stop dog 44 so that the projection 19 on the catch lever drops into engagement with the teeth 21 of the catch wheel, as shown in Fig. 4. Preferably, these teeth are beveled or inclined so as to permit the return of the indicator to normal zero position in the direction indicated by the arrow in Fig. 4. The teeth, however, effectively prevent movement of the indicating mechanism in the opposite direction and are so closely spaced that they prevent the proper oscillation and balancing of the indicator in any position. When the weight is removed from the scale platform, the rack 35, disc 30 and arm 32 are quickly returned to normal independently of the indicator shaft 15 and parts fixed thereto, but, since the teeth 21 are beveled to permit the rotation of the catch wheel 16 in the direction indicated by the arrow in Fig. 4, the indicator shaft and the pointer 14 are returned to zero position at substantially the same time. At the end of this return movement, the inclined cam edge of the lug 20 lifts the inner end of the catch lever and the latter again engages the notch of the lug to lock the indicator mechanism in zero position.

It is obvious that changes may be made in the details set forth without departure from the essentials of the invention as defined in the claims.

We claim as our invention:—

1. In a weighing scale, a counterbalanced, weight-actuated member adapted to be shifted to different positions in accordance with the load thereon, a shiftable indicator adapted to be arrested by said member in different weight indicating positions, a toothed part connected to and shiftable with said indicator, a coin-controlled catch cooperating with said toothed part, a dog for holding said catch disengaged during the weight indicating operation and a trip for said dog adapted to be operated by said weight-actuated member to effect the engagement of said catch with said toothed part in any of the different positions of said indicator, said catch and toothed part, when engaged, serving to prevent a second weight indicating operation.

2. In a weighing scale, the combination of a counterbalanced, weight-actuated member adapted to be shifted to different positions in accordance with the load thereon, a shiftable indicator adapted to be arrested by said member in different indicating positions, a toothed part connected to and shiftable with said indictator, a coin-controlled catch cooperating with said toothed part and a dog controlled by said weight-actuated member for holding said catch disengaged during the weight indicating operation, said dog being arranged to permit the engagement of said catch when the load on said member is reduced to thereby prevent a second weight indicating operation.

3. In a weighing scale, the combination of a counterbalanced, weight-actuated member adapted to be shifted to different positions in accordance with the load thereon, a shiftable indicator adapted to be arrested by said member in different indicating positions, a toothed part connected to and shiftable with said indicator, a coin-controlled catch cooperating with said toothed part and a dog controlled by said weight-actuated member for holding said catch disengaged during the weight indicating operation, said dog being arranged to permit the engagement of said catch when the load on said member is reduced, and said toothed and catch parts being arranged when engaged to prevent a second weight indicating operation, but permitting the return of said indicator to normal zero position.

4. In a weighing scale, the combination of a counterbalanced, weight-actuated mechanism, a dial, a cooperating indicator movable over said dial and adapted to be arrested by said weighing mechanism in different weight indicating positions, a toothed wheel connected to and shiftable with said indicator, a coin-controlled catch cooperating with said wheel and arranged to engage the same wheel in the different positions of said indicator to prevent a second weight indicating operation of the latter, a dog for holding said catch disengaged during the weight indicating operation and a trip for releasing said dog actuated by said weighing mechanism when the load thereon is reduced.

5. In a weighing scale, the combination of a counterbalanced, freely movable weighing mechanism, a normally locked shiftable indicator adapted to be arrested by said mechanism in different weight indicating positions, a releasable catch normally holding said indicator in zero position, a dog for maintaining said coin controlled catch in released position during the weight indicating operation and a toothed tripping member connected to and actuated by said weighing mechanism, when the load thereon is reduced, for releasing said dog and permit the re-engagement of said catch with said indicator in any of the different weight indicating positions thereof and thereby prevent a further weight indicating operation.

6. In a weighing scale, the combination of a counterbalanced weighing mechanism, a shiftable indicator adapted to be arrested by said weighing mechanism in different weight indicating positions, a toothed wheel connected to and shiftable with said indicator, a releasable coin controlled catch normally engaging said wheel to hold said indicator in zero position, a dog for holding said catch, when released, out of engagement with said toothed wheel and a trip for said dog actuated by said weighing mechanism when the load thereon is reduced to thereby effect the re-engagement of said catch with said toothed wheel and prevent a second weight indicating operation.

7. In a scale, the combination of a weighing mechanism, a dial, a cooperating indicator, a toothed member connected to said indicator having a raised lug, a catch normally engaged with said raised lug to hold said indicator in zero position, a coin controlled trip for said catch, a dog for holding said catch from engagement with the teeth of said member, and a trip for said dog actuated by said weighing mechanism when the load thereon is reduced.

8. In a weighing scale, the combination of a counterbalanced, weight-actuated member adapted to be shifted to different positions in accordance with the load thereon, a shiftable indicator adapted to be arrested by said member in different weight indicating positions, a toothed part connected to and shiftable with said indicator, a coin controlled catch normally engaging said toothed part to hold said indicator in zero position and adapted to be re-engaged with said part in any of the different shifted positions of said indicator to prevent a second weight indicating operation, a dog operative when said catch is released to hold the latter disengaged and a trip operatively connected to said weight-actuated member to shift said dog and permit the re-engagement of said catch with said toothed part.

9. In a weighing scale, the combination of a counterbalanced, weight-actuated member adapted to be shifted to different positions in accordance with the load thereon, a shiftable indicator adapted to be arrested by said member in different weight indicating positions, a toothed part connected to and shiftable with said indicator, a coin controlled catch normally engaging said toothed part to hold said indicator in zero position and adapted to be re-engaged with said part in any of the different shifted positions of said indicator to prevent a second weight indicating operation, a dog normally and automatically operative when said catch is released to hold the latter disengaged and a toothed part movable back and forth with same said weight-actuated member and operative to release said dog only when moved in one direction by the reduction in the load on said member.

10. In a coin-controlled weighing scale, the combination of a counterbalanced, weight-actuated member movable to different positions in accordance with the load thereon, a shiftable indicator arrested by said member in different weight-indicating positions, a toothed part and a cooperating catch adapted to be engaged in different positions of said indicator to interfere with the operation thereof, a dog operable in the normal position of said weight-actuated member for holding said catch and toothed part disengaged, and a trip for said dog controlled by said weight-actuated member and operative to release the dog only when the load on said member is reduced.

11. In a weighing scale, the combination of a counterbalanced weighing mechanism, a shiftable indicator arrested by said mechanism in different weight-indicating positions, a toothed part shiftable with said indicator, a coin-controlled catch arranged to engage said toothed part in different positions of said indicator to interfere with the weight-indicating operation thereof, a dog operative both in the normal and off-normal condition of said weighing mechanism for holding said catch disengaged and a trip for said dog actuated by said weight mechanism and operative to release the dog only when the load on the weighing mechanism is reduced.

12. In a weighing scale, the combination of a counterbalanced weighing mechanism, a shiftable indicator arrested by said mechanism in different weight-indicating positions, a toothed part connected to and shiftable with said indicator, a coin-controlled catch normally engaging said toothed part to hold the indicator in zero position and adapted to be re-engaged with the toothed part in any of the different shifted positions of said indicator to interfere with the weight-indicating operation thereof, a dog operative both in the normal and off-normal condition of said weighing mechanism for holding said catch, when the latter is released, disengaged from said toothed part and a trip for said dog shiftable with said weighing mechanism and operative to release the dog when the load on the weighing mechanism is reduced.

THOMAS W. B. WATLING.
JERRY MACOUREK.